May 23, 1944. F. A. TRUESDELL 2,349,314
MOTION CONVERTING MECHANISM
Original Filed Sept. 27, 1937 2 Sheets-Sheet 1
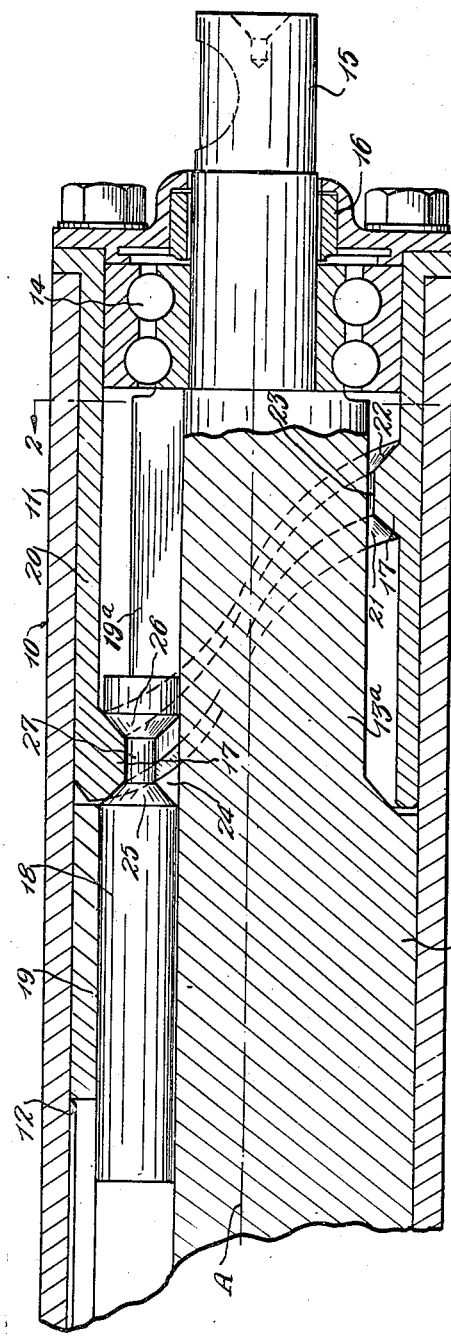
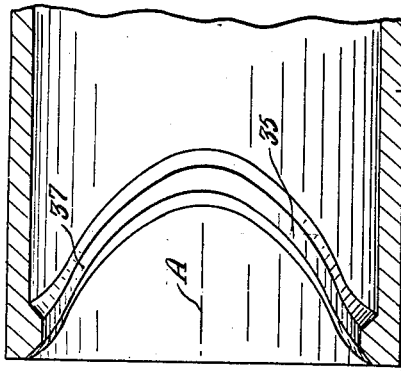
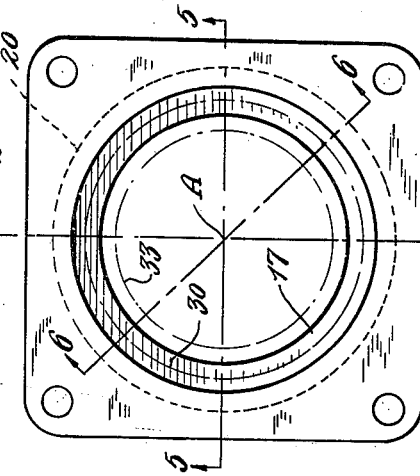
INVENTOR.
FRED A. TRUESDELL, DECEASED
BY JETTA TRUESDELL, ADMX.
Kwis Hudson & Kent
ATTORNEYS May 23, 1944.   F. A. TRUESDELL   2,349,314
MOTION CONVERTING MECHANISM
Original Filed Sept. 27, 1937   2 Sheets-Sheet 2
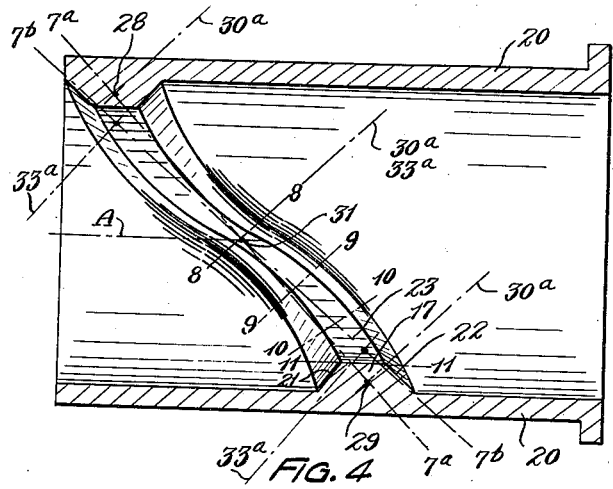
FIG. 4
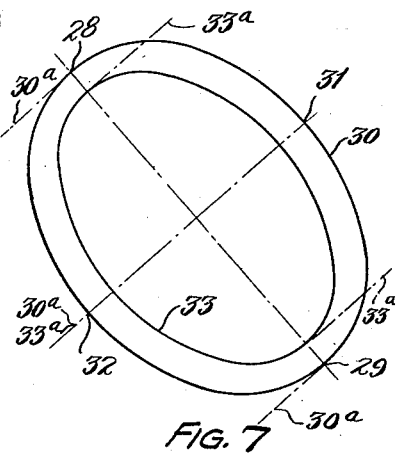
FIG. 7
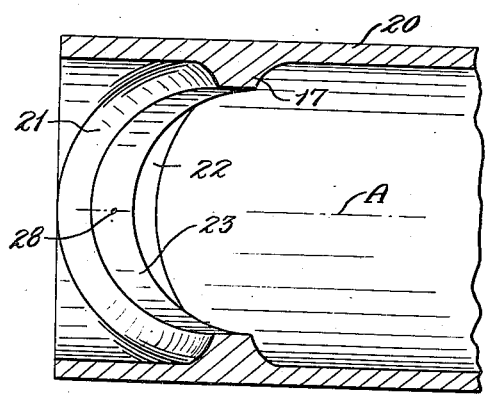
FIG. 5
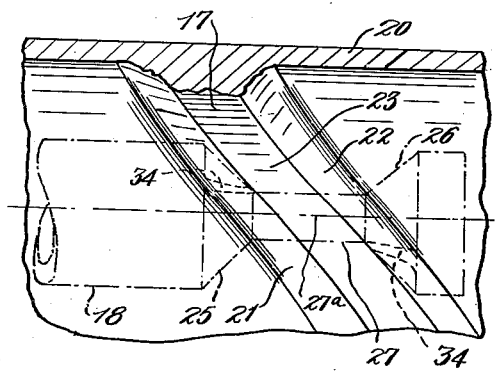
FIG. 12
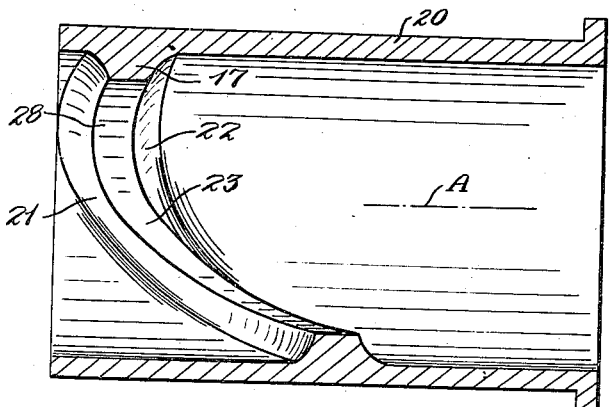
FIG. 6
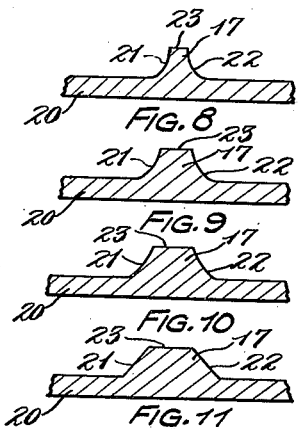
FIG. 8
FIG. 9
FIG. 10
FIG. 11
INVENTOR.
FRED A. TRUESDELL, DECEASED
BY JETTA TRUESDELL, ADMX.
ATTORNEYS Patented May 23, 1944

2,349,314

UNITED STATES PATENT OFFICE 2,349,314

MOTION CONVERTING MECHANISM

Fred A. Truesdell, deceased, late of East Cleveland, Ohio, by Jetta Truesdell, administratrix, East Cleveland, Ohio, assignor of one-half to Wilmer S. Fallon, Cleveland, Ohio Original application September 27, 1937, Serial No. 166,032. Divided and this application February 25, 1942, Serial No. 432,342

13 Claims. (Cl. 74—56)

This invention relates to motion converting devices for converting rotary into reciprocating motion or vice-versa, and aims to provide a simple and efficient construction for a device of this kind which can be readily embodied in a pump, engine, or hydraulic motor.

Another object of this invention is to provide an improved construction for a device of this kind having cooperating cam and follower elements and in which the cam and follower elements are shaped to cooperate substantially without backlash, vibration, or shock and with a relatively increased area of contact at the points of maximum load so as to minimize wear.

A further object of the invention is to provide an improved construction for a conversion device of the character mentioned having a cam element in the form of an endless generally elliptical ridge lying in a plane extending oblique to the rotation axis, and in which the width and side faces of the cam ridge are such that a cam follower having opposed substantially frustoconical bearing portions will cooperate therewith with minimum wear and substantially without backlash, vibration, or shock.

Still another object of this invention is to provide an improved conversion device of the character referred to in which the cam element is integral with and generated on a cylindrical metal body.

Yet another object of this invention is to provide an improved conversion device of this character in which the integral generated cam element is on the inner surface of a cylindrical metal sleeve.

It is also an object of this invention to provide a conversion device of the character referred to in which the cam and follower are of such form that the follower has simple harmonic motion.

Other objects and advantages of the invention will be apparent from the following description when taken in conjunction with the accompanying sheets of drawings, in which:

Fig. 1 is a partial longitudinal sectional view taken through a motion converting mechanism embodying the present invention;

Fig. 2 is a transverse sectional view taken through such mechanism on line 2—2 of Fig. 1;

Fig. 3 is a detached end view of the cam sleeve;

Figs. 4, 5, and 6 are longitudinal sectional views taken, respectively, on lines 4—4, 5—5, and 6—6 of Fig. 3;

Fig. 7 is a diagram showing the form of the primary and secondary secant planes as projected from the oblique or secant planes 7a—7a and 7b—7b of Fig. 4, said diagram also illustrating the generally elliptical shape of the cam;

Figs. 8 to 11, inclusive, are partial sectional views taken through the cam at 30° intervals, as indicated in Fig. 4, and showing the progressively changing cross-sectional shape of the cam;

Fig. 12 is a larger scale sectional view through the cam adjacent its point of minimum width and maximum load and showing the relatively increased area of contact between the cam and follower; and Fig. 13 is a sectional view similar to Fig. 4, but showing a double-throw cam.

This application is a division of application Serial No. 166,032 filed September 27, 1937.

In Figs. 1 and 2 the motion conversion mechanism of the present invention is shown as being embodied in a machine 10 having a housing 11 provided with a cylindrical chamber 12 in which a rotor 13 operates. The rotor may be supported for rotation by suitable bearings 14 and may have a shaft portion 15 which projects through the cover 16 of the housing. The motion converting mechanism comprises a cam 17 connected with or carried by the housing and one or more cam followers 18 reciprocatably slidable in the rotor 13.

The rotor 13 may comprise an elongated body having a plurality of guideways or cylinders 19 in which the cam followers 18 operate. The cylinders or guideways 19 may extend axially of the rotor 13 in substantially parallel relation and may be arranged in an annular series which is concentric with the rotation axis, as shown in Fig. 2. The rotor portion 13a which is nearest the housing cover 16 may be of relatively reduced diameter and the guideways 19a, which are formed on this reduced rotor portion as continuations of the guideways 19, may be substantially semi-circular instead of complete or full cylinders.

The cam 17 may be carried by a substantially cylindrical member or sleeve 20 which extends into the housing so as to surround the reduced portion 13a of the rotor. The bearing 14a supporting the rotor may be suitably mounted in the housing 11, or, as shown in this instance, may be mounted in the cam sleeve 20. The form of the cam 17 will be described in greater detail hereinafter, but as seen from Figs. 1 and 3, comprise in general an endless elliptical ridge projecting from the inner surface of the cam sleeve 20 and lying in a transverse or secant plane extending obliquely to the axis of rotation of the rotor 13. The cam 17 has converging side faces 21 and 22 and a top face or land 23. The cam follower 18 has a cam-engaging portion in the form of a notch or groove 24 in which the cam ridge 17 engages. This notch or groove is defined by two opposed substantially frusto-conical bearing portions 25 and 26 which engage the side faces 21 and 22 of the cam and are connected by the reduced cylindrical portion 27 which engages the top face or land 23.

From the arrangement thus far described, it will be seen that when relative rotation occurs between the rotor 13 and the cam sleeve 20, the grooves or notches 24 of the followers 18 will traverse the cam 17 and the followers will have reciprocating movement in the guideways 19 and 19a. As representing a practical embodiment of the motion converting mechanism herein disclosed, copending application Serial No. 454,773, filed August 14, 1942, shows such mechanism embodied in a fluid pump or motor. The machine 10 may be a pump, or may be a hydraulic motor or engine. When the machine is operated as a pump, power is applied to the shaft portion 15 of the rotor 13 while the cam sleeve 20 is held stationary and the relative rotation between the rotor and cam sleeve produces reciprocation of the followers 18, which then operate as plungers in the cylinders 19 to create pressure or displacement in the fluid being pumped. When the machine is operated as a hydraulic motor or engine, fluid pressure acts on the cam followers 18, which then serve as pistons, and the pressure of the followers against the stationary cam 17 produces a reaction in the rotor 13 causing rotation of the rotor and the shaft 15. Obviously if the rotor were held stationary the pressure of the followers against the cam would cause rotation of the cam and housing. In either case it will be seen that the cam 17 and the followers 18 cooperate to convert rotary into reciprocating movement or vice-versa.

The form of the cam 17 can be best described by reference to Figs. 4 to 11, inclusive, from which it will be seen that the cam projects as an endless or generally elliptical ridge extending around the inner surface of the cam sleeve 20 and lying substantially in a secant plane 7a—7a which is oblique to the rotation axis and may intersect the latter at an angle of approximately 45°. The cam ridge has a cross-sectional shape corresponding substantially with that of a truncated isoceles triangle of which the side segments form the working faces 21 and 22 of the cam. The generally elliptical shape of the cam is represented by the ellipse 30 of Fig. 7 which has been projected from the secant plane 7a—7a as indicated by the projection lines 30a.

The cam ridge is of varying width or axial thickness, as shown in Figs. 4, 5, and 6, and varies progressively from points of maximum thickness located at the ends 28 and 29 of the major axis of the ellipse 30 to points of minimum thickness 31 and 32 located at the ends of the minor axis of the ellipse. It is apparent from Figs. 1 and 2 that the points or sections of maximum thickness may be referred to as idling points or points of dead center because the reciprocating or axial movement of the follower 18 reduces to zero when these points or sections are traversed by the cam-engaging portion of the follower. The cam points or sections 31 and 32 of minimum thickness may be referred to as the working sections of the cam because they impart maximum reciprocating or axial movement to the follower and are subjected to the maximum working pressure when these sections are traversed by the cam-engaging portion of the follower.

The above-mentioned secant plane 7a—7a may be referred to as the working plane or primary secant plane because it extends through or substantially through the four midpoints of the cam which are represented by the points 28, 29, 31, and 32. The points 28, 29, 31, and 32 are imaginary points within the cam spaced 90° apart and lying substantially midway between its working faces 21 and 22 and at substantially the midpoint of the height or altitude of the cam.

A second oblique or secant plane 7b—7b is shown in Fig. 4 and may be referred to as the plane of cam generation or the secondary secant plane. This secondary plane extends at a somewhat smaller angle of obliquity than the primary plane 7a—7a and contains the locus of the midpoint 27a of the reduced portion or neck 27 of the follower 18 as the latter rolls around on the cam. This locus describes an ellipse 33 on the secant plane 7b—7b corresponding substantially with the ellipse 33 of Fig. 7 which has been projected on the lines 33a.

The cam ridge 17 may be formed in various ways, but is preferably generated on the inner surface of the cam sleeve 20 about its longitudinal axis A by means of a rotating and revolving axially movable tool or cutter, such as a milling cutter (not shown), having a contour substantially identical with the cam-engaging portion of the follower 18. By causing such a tool or cutter to follow the outline of the ellipse 33 in the secondary secant plane 7b—7b, the cutter will generate the cam 17 about the longitudinal axis A of the cam sleeve 20. When the cam ridge is formed in this way, it will be found that the converging sides or working faces 21 and 22 will be substantially straight or flat at the relatively wide sections 28 and 29 and will be concavely curved at the relatively narrow sections 31 and 32. At points between these relatively wide and relatively narrow sections of the cam ridge, the sides or working faces will vary progressively in shape as represented by the sections or profiles illustrated in Figs. 9 and 10, and the curved side faces of the relatively narrow sections of the cam will merge smoothly into the relatively straight or flat side faces of the relatively wide sections of the cam.

It will be readily seen that when the cam 17 has the form above described and is generated in the manner explained, the follower or followers 18 cooperating with such cam will have a true simple harmonic motion. This is highly desirable in a motion converting device of this character because it affords greater efficiency and smoother operation. By varying the obliquity of the secant planes 7a—7a and 7b—7b from the angles shown in Fig. 4 the stroke or throw of the follower 18 can be varied as desired and its reciprocating movement will in all cases still be simple harmonic motion.

It is important to note that the frusto-conical bearing portions 25 and 26 of the follower 18 will have substantially a line contact with the straight sides 21 and 22 of the relatively wide sections of the cam and will have contact portions of a relatively larger area when these frusto-conical bearing portions engage the concave sides of the relatively narrow sections 31 and 32 of the cam. In other words, at the points of engagement of the follower with the cam 17 corresponding with minimum load, the contact will be substantially a line contact, but when the follower engages the cam at the points of maximum load, the contact area will be substantially greater than a line contact and will have substantially the shape and area of the contact areas 34 represented in Fig. 12. These relatively larger contact areas at the points of maximum load are very desirable and important because the load is distributed over a considerably larger surface and wear of the parts is reduced to a minimum. That line contacts exist between the cam and follower at the points 28 and 29 will be understood from the fact that the convex bearing portions 25 and 26 engaging the straight sides 21 and 22 of the cam are substantially tangent to the straight sides and such tangency produces a line contact. Likewise, it will be understood that the engagement of the convex bearing portions 25 and 26 with the concave sides of the cam at the points 31 and 32 produces an area of contact which is substantially wider than a line contact because the convex and concave surfaces interfit more or less with each other. It will also be seen that centrifugal force acting on the followers 18 during the rotation of the rotor 13 will press the bearing portions 25 and 26 of the follower against the sides 21 and 22 of the cam and may also press the cylindrical connecting portion 27 of the follower against the land 23.

The cam 17 shown in Figs. 1, 3, and 4 is a single-throw cam which, during one revolution of the rotor 13, will cause one forward and one return stroke of the follower 18. It will be readily seen, however, that the cam can be formed as a multi-throw cam which will produce two or more complete strokes of the follower cooperating therewith. In Fig. 13 of the drawings, I show a double-throw cam 35 formed on the inner surface of the cam sleeve 36. The cam 35 is similar to the cam 17, but by reason of the fact that it is a multi-throw cam, it will have a sinuous shape rather than an elliptical shape, but its relatively narrow sections 37 corresponding with the points of maximum load will still lie in oblique or secant planes which intersect the rotation axis at the desired angle of obliquity. The cam 35 will also impart simple harmonic motion to its follower.

From the foregoing description and the accompanying drawings, it will be understood that the present invention provides a simple and efficient conversion mechanism by which rotary motion can be converted to reciprocating motion or vice-versa and which is well suited for use in either a pump, or in a hydraulic motor or engine.

Although the present invention has been illustrated and described in more or less detail, there is no intention to limit the invention to the details and particular arrangements disclosed, but the invention is regarded as including all changes and modifications coming within the scope of the appended claims.

The above-described invention is claimed as follows:

1. In apparatus for converting rotary into reciprocating motion, a body having a plurality of axially slidable cam followers thereon, a second body substantially coaxial with the first body and having a cam engaged by said followers, one of said bodies being adapted for relative rotation to produce reciprocation of said followers, said second body being substantially cylindrical and said cam comprising an endless ridge having its base connected with said second body and having alternate relatively wide and relatively narrow portions of which the relatively narrow portions lie substantially in a secant plane of the cylindrical body and have concavely curved side walls diverging toward the base of the cam.

2. In apparatus for converting rotary into reciprocating motion, a body having a plurality of axially slidable cam followers thereon, a second body substantially coaxial with the first body and having a cam engaged by said followers, one of said bodies being adapted for relative rotation to produce reciprocation of said followers, said second body being substantially cylindrical and said cam comprising an endless ridge having its base connected with said second body and having alternate relatively wide and relatively narrow portions of which the relatively narrow portions lie substantially in a secant plane of the cylindrical body and have concavely curved side walls diverging toward the base of the cam, said relatively wide portions of the ridge having substantially straight side walls diverging toward the base of the cam, said curved and straight side walls of said relatively narrow and relatively wide portions of the ridge being merged smoothly into each other.

3. In apparatus of the character described, a body having a substantially cylindrical opening and an endless integral internal cam generated on said body in the form of a ridge having its base connected with said body and comprising alternate relatively wide and relatively narrow portions merging smoothly into each other and whose sides diverge toward the base of the cam.

4. In apparatus of the character described, a body having a substantially cylindrical opening and an endless integral internal cam generated on said body in the form of a ridge having its base connected with said body and comprising alternate relatively wide and relatively narrow portions merging smoothly into each other, said relatively wide portions having substantially straight side walls diverging toward the base of the cam and said relatively narrow portions having concave side walls diverging toward the base of the cam.

5. In apparatus of the character described, a body having a substantially cylindrical opening and an endless integral internal cam generated on said body in the form of a ridge having its base connected with said body and comprising alternate relatively wide and relatively narrow portions merging smoothly into each other and whose sides diverge toward the base of the cam, and a reciprocating follower cooperating with said cam and having simple harmonic motion.

6. In apparatus of the character described, a body having a substantially cylindrical opening and an endless integral internal cam generated on said body in the form of a ridge having its base connected with said body and comprising alternate relatively wide and relatively narrow portions merging smoothly into each other, said relatively wide portions having substantially straight side walls diverging toward the base of the cam and said relatively narrow portions having concave side walls diverging toward the base of the cam, and a reciprocating follower cooperating with said cam and having simple harmonic motion.

7. In apparatus of the character described, a substantially cylindrical body having thereon an endless cam ridge lying substantially in a secant plane and whose base is connected with said body, and an axially movable cam follower having opposed substantially frusto-conical bearing portions arranged to straddle the cam ridge and engage the side faces thereof, said cam ridge having alternate relatively narrow and relatively wide portions merging smoothly with each other, said relatively wide portions having substantially straight side faces diverging toward the base of the cam and with which said bearing portions have substantially a line contact and said relatively narrow portions having concave side faces diverging toward the base of the cam and with which said bearing portions have contact of greater area than a line contact.

8. In apparatus of the character described, a substantially cylindrical sleeve having an integral internal endless cam ridge thereon lying substantially in a secant plane and whose base is connected with said sleeve, and a rotatable body having thereon an axially slidable cam follower provided with opposed substantially frusto-conical bearing portions arranged to straddle the cam ridge and engage the side faces thereof, said cam ridge having alternate relatively narrow and relatively wide portions merging smoothly with each other, said relatively wide portions having substantially straight side faces diverging toward the base of the cam and with which said bearing portions have substantially a line contact and said relatively narrow portions having concave side faces diverging toward the base of the cam and with which said bearing portions have contact of greater area than a line contact.

9. In apparatus of the character described, a substantially cylindrical body having thereon an endless cam ridge lying substantially in a secant plane and whose base is connected with said body, and an axially movable cam follower having opposed substantially frusto-conical bearing portions arranged to straddle the cam ridge and engage the side faces thereof, said cam ridge having alternate relatively narrow and relatively wide portions merging smoothly with each other, said relatively wide portions having substantially straight side faces diverging toward the base of the cam and with which said bearing portions have substantially a line contact and said relatively narrow portions having concave side faces diverging toward the base of the cam and with which said bearing portions have contact of greater area than a line contact, said relatively wide portions of the cam ridge being relatively closer to the ends of said sleeve than said relatively narrow portions and said relatively narrow portions being substantially midway between said relatively wide portions.

10. In apparatus for converting rotary into reciprocating motion, a body having a plurality of axially slidable cam followers thereon, a second body substantially coaxial with the first body and having a cam engaged by said followers, one of said bodies being adapted for relative rotation to produce reciprocation of said followers, said second body being substantially cylindrical and said cam comprising an endless ridge having its base connected with said second body and having alternate relatively wide and relatively narrow portions of which the relatively narrow portions lie substantially in a secant plane of the cylindrical body and have concavely curved side walls diverging toward the base of the cam, said followers being cylindrical members having circumferentially grooved portions in rolling contact with said cam.

11. In apparatus for converting rotary into reciprocating motion, a body having a plurality of axially slidable cam followers thereon, a second body substantially coaxial with the first body and having a cam engaged by said followers, one of said bodies being adapted for relative rotation to produce reciprocation of said followers, said second body being substantially cylindrical and said cam comprising an endless ridge having its base connected with said second body and having alternate relatively wide and relatively narrow portions of which the relatively narrow portions lie substantially in a secant plane of the cylindrical body and have concavely curved side walls diverging toward the base of the cam, said relatively wide portions of the ridge having substantially straight side walls diverging toward the base of the cam, said curved and straight side walls of said relatively narrow and relatively wide portions of the ridge being merged smoothly into each other, said followers being cylindrical members having circumferentially grooved portions in rolling contact with said cam and having their axes parallel to the common axis of said first and second bodies.

12. In apparatus of the character described, a body having a substantially cylindrical opening and an endless integral internal cam generated on said body in the form of a ridge having its base connected with said body and comprising alternate relatively wide and relatively narrow portions merging smoothly into each other and whose sides diverge toward the base of the cam, and a reciprocating cylindrical follower having a circumferentially grooved portion in rolling contact with said cam.

13. In apparatus of the character described, a substantially cylindrical body having thereon an endless cam ridge lying substantially in a secant plane and whose base is connected with said body, and an axially movable cylindrical cam follower in rolling contact with the cam ridge and having opposed substantially frusto-conical bearing portions arranged to straddle the cam ridge and engage the side faces thereof, said cam ridge having alternate relatively narrow and relatively wide portions merging smoothly with each other, said relatively wide portions having substantially straight side faces diverging toward the base of the cam and with which said bearing portions have substantially a line contact and said relatively narrow portions having concave side faces diverging toward the base of the cam and with which said bearing portions have contact of greater area than a line contact.

JETTA TRUESDELL,
*Administratrix of the Estate of Fred A. Truesdell, Deceased.*